United States Patent [19]

Stockton

[11] Patent Number: 5,511,463
[45] Date of Patent: Apr. 30, 1996

[54] STRUCTURE FOR MOUNTING AND SEALING A PISTON SLEEVE WITHIN AN ACTUATOR BODY

[76] Inventor: Elmer A. Stockton, 4611 Bretton Bay La., Dallas, Tex. 75287

[21] Appl. No.: 326,028

[22] Filed: Oct. 19, 1994

[51] Int. Cl.[6] .................................................. F01B 11/02
[52] U.S. Cl. .................... 92/171.1; 92/165 R; 92/169.1; 92/168
[58] Field of Search ........................... 92/165 PR, 168, 92/165 R, 166, 169.1, 171.1

[56] References Cited

U.S. PATENT DOCUMENTS

| 2,282,502 | 5/1942 | Suth | 92/171.1 |
|---|---|---|---|
| 2,692,584 | 10/1954 | Armington et al. | 92/168 |
| 4,574,591 | 3/1986 | Bertsch | 92/171.1 |
| 5,172,625 | 12/1992 | Latham | 92/165 R |

FOREIGN PATENT DOCUMENTS

| 0687108 | 2/1953 | United Kingdom | 92/171.1 |
|---|---|---|---|
| 0752605 | 7/1956 | United Kingdom | 92/171.1 |

*Primary Examiner*—Thomas E. Denion
*Attorney, Agent, or Firm*—L. Dan Tucker

[57] ABSTRACT

A fluid pressure actuator for aircraft ailerons comprises a body having a bore within which a piston sleeve or bushing is mounted only by its inner end. The fluid pressure actuated piston is in turn slidably and sealably mounted in the piston sleeve independently of the actuator body.

3 Claims, 1 Drawing Sheet

STRUCTURE FOR MOUNTING AND SEALING A PISTON SLEEVE WITHIN AN ACTUATOR BODY

TECHNICAL FIELD OF THE INVENTION

The invention relates to a fluid pressure actuator for controlling ailerons on an aircraft, and particularly to an improved structure for mounting and sealing a piston sleeve or bushing within an actuator body.

BACKGROUND OF THE INVENTION

Modern jet aircraft, such as the Boeing 727, employ a plurality of fluid pressure actuators to control the ailerons of the aircraft. Experience has shown that after approximately 10,000 hours of operation, binding of the piston within its supporting bushing is apt to occur, resulting in damage to the actuator body. Such damage is believed to be due to the deterioration of the primary seal which allows the pressurized hydraulic fluid to leak past the primary seal and pressurize the secondary seal. Since the secondary seal is normally held in place by a support bushing, such leakage and pressurization of the secondary seal imposes axial forces on the support bushing. These axial forces are then transferred through the support bushing to the support flanges of the actuator housing. Such support flanges normally have areas of unequal cross section and unequal strength resulting in structural failures to the housing or in some instances resulting in the support bushing being allowed to assume a cocked position to thereby cause the piston to bind or to be seized by the support bushing. This, of course, cannot be tolerated on any commercial or military aircraft. An alternative theory of housing failure or piston binding suggests that an accumulation of manufacturing axial tolerances, plus wear, permits the piston bushing to assume a cocked position relative to the actuator body. It will be appreciated that excessive axial tolerance in such devices can be a problem since the cumulative or net axial tolerance from a manufacturing or assembly process is the sum of the tolerances for all of the components of the assembly. Thus even under the most careful manufacturing or assembly conditions the cumulative axial tolerance will be the sum of the individual tolerances for each of the components in an axial orientation. Excessive cumulative axial tolerance may permit the support bushing to repeatedly impact the support flanges on the housing as the piston assembly is repeatedly cycled. Such repeated impact on the flanges of the housing will cause metal fatigue in the housing or will cause the support bushing to become cocked so as to cause the piston to bind on the cocked surfaces of the bushing.

There is a need therefore, for an improved piston sleeve or bushing for mounting the piston within the actuator body without binding, and which does not rely upon any flange on the actuator body for securing the secondary seal element for the piston.

SUMMARY OF THE INVENTION

This invention provides an improved bushing or piston sleeve for slidably and sealably mounting an actuating piston in the bore of an actuator body. Such piston sleeve is provided with a plurality of axially spaced, external elastomeric sealing elements which sealingly engage the bore of the actuator body. The piston sleeve is axially secured to the actuator body only at its inner end and thus floats in the actuator body bore on the sealing elements, permitting non-binding movement of the piston therein.

Fluid pressure inlet and bleed ports are provided intermediate the axially spaced external seals. The piston is provided with a conventional primary piston seal carried on its periphery adjacent the inner end face of the piston which is subjected to pressurized fluid. A secondary seal is located in the piston sleeve at a position adjacent its outer end. Such secondary seal is secured in position by a support or retaining ring which in turn is secured by a snap ring or other suitable retaining means. The snap ring is secured in a groove in the extreme outer end of the piston sleeve.

With the aforedescribed construction, the floating mounting of the piston sleeve accommodates piston eccentricity due to manufacturing tolerances and from normal wear. Further, any fluid leakage past the piston seal does not create a force on any portion of the actuator body, but only imparts an axial force to the secondary seal, its support ring and the snaping. These elements are quite capable of resisting the aforedescribed axial forces due to leakage of the primary piston seal for a substantial period of time without producing any cocking or misalignment of either the seal or the support ring with respect to the piston. The construction of this invention also reduces damage to secondary seals that is encountered from hydraulic fluid hammering or impact that is experienced in prior art constructions. The hammering effect on weak or thin areas of prior art actuator assemblies can cause cracks and actuator assembly failure. The construction of this invention reduces leakage of hydraulic fluid into contact with such thin or weak areas, thereby eliminating hydraulic fluid hammering in such areas. Thus, the useful life of the actuator assembly is significantly increased.

Further objects and advantages of the invention will be readily apparent to those skilled in the art from the following detailed description, taken in conjunction with the annexed sheet of drawings, on which is shown a preferred embodiment of the invention.

BRIEF DESCRIPTION OF THE DRAWINGS

For a more complete understanding of the present invention and the advantages thereof, reference is now made to the following Description of the Preferred Embodiment, taken in conjunction with the accompanying drawings, in which.

DESCRIPTION OF THE PREFERRED EMBODIMENT

Figure 1:
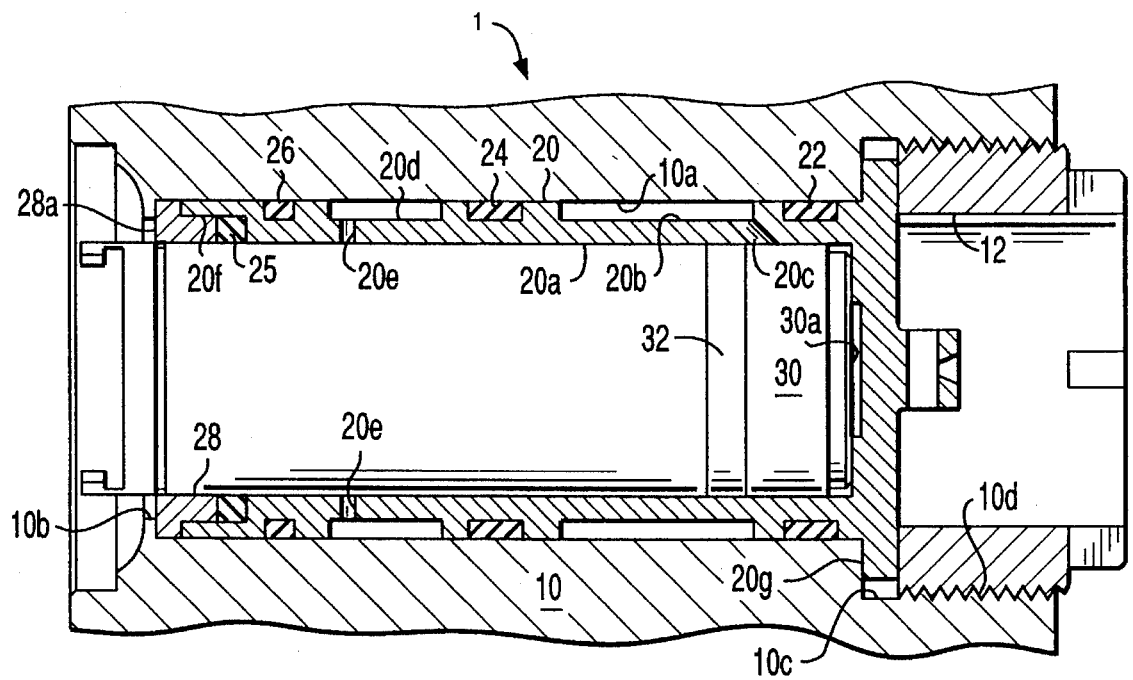
FIG. 1 is a cross-sectional view of a prior art aileron actuator assembly.

Referring to FIG. 1, the numeral 1 indicates a prior art aileron actuator assemblage of the type employed on Boeing 727 aircraft. Such assemblage includes an actuator body 10 having a bore 10a in which is mounted a piston sleeve or bushing 20. A piston 30 is slidably mounted within the bore 20a of bushing 20 and, adjacent the inner end of piston 30, a primary seal or packing 32 is conventionally mounted for sealing engagement with the bore 20a of the piston bushing 20.

The piston bushing 20 is provided on its exterior with a plurality of axially spaced sealing elements 22, 24 and 26. Intermediate the sealing elements 22 and 24, the piston bushing 20 is provided with an annular recess 20b and a plurality of radial ports 20c extend from such recess 20b to the inner solid end 30a of the piston 30. The recesses 20b communicate with a source of pressurized fluid (not shown) and hence the ports 20c constitute fluid pressure inlet ports for the actuator assemblage.

Intermediate the external seals 24 and 26, an annular recess 20d is formed on the piston sleeve or bushing 20 and a plurality of peripherally spaced radial ports 20e communicate between the recess 20d and the bore 20a of the piston bushing 20. The annular recess 20d is in communication with the inlet end of the hydraulic system (not shown) and hence functions as a bleed passage for any of the pressurized fluid that leaks past the primary piston seal 32. To prevent such leakage fluid from escaping to the atmosphere, a secondary sealing element 25 is mounted within a counterbore 20f formed in the outer end of the piston sleeve 20. The secondary piston seal 25 is secured in position by an abutment ring 28 which is contoured to fit snugly in counterbore 20f and its outer axial or annular face 28a abuts an internally projecting seal support flange 10b formed at the outer end of the bore 10a of the actuator body 10. Significant problems are encountered when there is non-uniform axial clearance between face 28a of abutment ring 28 and support flange 10b. For example, if support flange 10b has nonuniform axial clearance between it and the outer face of abutment ring 28a, then under operating conditions, abutment ring 28a will assume a cocked position and will cause piston assembly 30 to seize-up in the system and possibly cause a catastrophic failure. Additionally uneven axial forces will be exerted on portions of support flange 10b of the housing and may cause the housing to crack or fail.

The inner end of piston sleeve or bushing 20 is fixedly secured to the actuator body 10 by having a radially extending flange 20g formed at its inner end and cooperating with a counterbore 10c provided in the inner end of bore 10a. Threads 10d are provided in the outer end of counterbore 10c to receive a locking ring 12 which secures the piston sleeve or bushing 20 in a fixed axial position relative to the actuator body 10. The piston sleeve 20 must be axially clamped in position against seal support flange 10b to support secondary seal 25. If secondary piston seal 25 is not clamped, then abutment ring 28 may assume a cocked position and secondary seal 25 is not adequately supported, producing a bind on the reciprocating movements of such piston and potential leakage. Any such binding in the controls for an aircraft cannot, of course, be tolerated.

Figure 2:
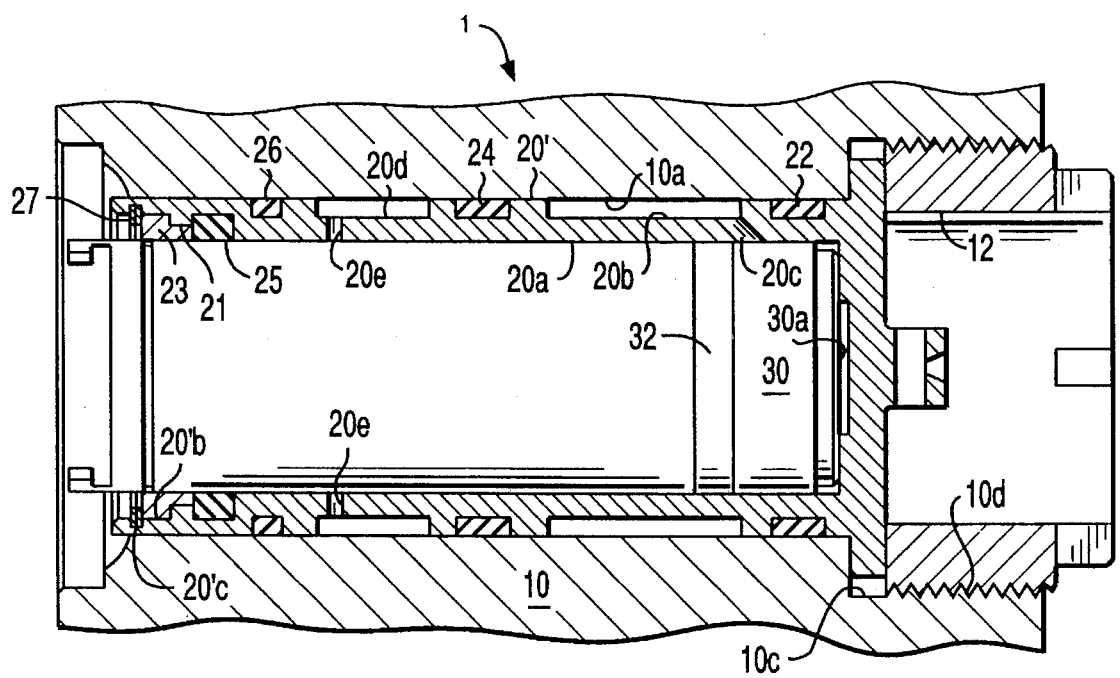
FIG. 2 is a cross-sectional view illustrating the improved aileron actuator assembly embodying this invention.

Referring now to FIG. 2 where the same numerals indicate parts identical to those shown in FIG. 1, the outer end of the piston sleeve or bushing 20' has been modified to provide a mounting for the secondary seal 25 which is independent of any flange or other portion of the actuator body 10. Thus, the outer axial end of the piston sleeve 20' is provided with an internally projecting rib or shoulder 21 which defines an annular recess within which the secondary seal element 25 may be inserted. Additionally, a counterbore 20'b is provided in the outer axial end of the piston sleeve 20' and such counterbore snugly receives an annular retaining ring 23 having an L-shaped cross-section. Retaining ring 23 is in turn secured in position by a snap ring 27 which is engaged in an annular groove 20'c formed in the outer axial end of the piston sleeve 20'. All other structural features of the actuator assemblage shown in FIG. 2 are identical to those elements previously described in connection with FIG. 1.

From examination of FIG. 2, it will be readily apparent that piston sleeve 20' is not clamped in bore 10a at its outer end. Hence, the axial tolerance buildup and clearance problem of the piston sleeve within actuator body 10 is drastically reduced because the housing 10 does not support the outer end of piston sleeve 20', nor does the housing 10 maintain retaining ring 23 in contact with secondary seal 25. Such an installation eliminates the problem of abutment ring 23 cocking and causing seizing of piston assembly 30. Additionally, pressurized fluid leaking past the primary piston seal 32 will exert an axial force on the secondary seal 25, its backup ring 21 and its retaining snap ring 27, but none of the axial force is imparted to any part of the actuator body 10. Thus, the possibility of fracture or cocking of the backup elements for the secondary seal 25 is substantially reduced, thus further reducing the possibility of binding of the piston 30 in the bore of the modified piston sleeve 20'.

Although the invention has been described in terms of a preferred embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit and scope of the described invention.

What is claimed is:

1. An aileron actuator assembly comprising:

an actuator body having a bore for receiving a piston sleeve;

said piston sleeve telescoped into said actuator body bore, the piston sleeve having a bore for receiving a piston;

means for rigidly securing only an inner end of said piston sleeve within said bore;

a plurality of axially spaced seals disposed between an exterior of said piston sleeve and said actuator body bore;

port means between two of an innermost of said axially spaced seals for supplying pressurized fluid to said piston sleeve bore;

a cylindrical piston element inserted in said piston sleeve bore and axially shiftable relative thereto;

said piston having an inner end portion engageable by pressurized fluid supplied through said port means;

a primary seal near the inner end of said piston engageable with said piston sleeve bore at a location axially outward of the innermost of said axially spaced seals;

a secondary seal mounted in an outer end of said piston sleeve and sealingly engageable with an axially outer end of said piston; and seal retainer means independent of said actuator body for securing said secondary seal to said piston sleeve, whereby fluid leakage past said primary seal produces a force solely on said piston sleeve and said seal retainer means.

2. The apparatus of claim 1 wherein said seal retainer means comprises:

a backup ring abutting a portion of said secondary seal;

portions defining a peripheral groove in the outer end of the bore in said piston sleeve and adjacent said backup ring; and a snap ring inserted in said peripheral groove and abutting said backup ring.

3. The apparatus of claim 1 wherein said plurality of axially spaced seals provide a floating mounting for said piston sleeve.

* * * * *